United States Patent [19]

Barkley

[11] Patent Number: 6,088,679
[45] Date of Patent: *Jul. 11, 2000

[54] WORKFLOW MANAGEMENT EMPLOYING ROLE-BASED ACCESS CONTROL

[75] Inventor: John Barkley, Darnestown, Md.

[73] Assignee: The United States of America as represented by the Secretary of Commerce, Washington, D.C.

[ * ] Notice: This patent issued on a continued prosecution application filed under 37 CFR 1.53(d), and is subject to the twenty year patent term provisions of 35 U.S.C. 154(a)(2).

[21] Appl. No.: 08/980,908

[22] Filed: Dec. 1, 1997

Related U.S. Application Data

[60] Provisional application No. 60/032,531, Dec. 6, 1996.

[51] Int. Cl.[7] .............................. G06F 15/20; G06F 12/14
[52] U.S. Cl. ........................................................ 705/8; 705/9
[58] Field of Search ..................................... 705/6, 7, 8, 9

[56] References Cited

U.S. PATENT DOCUMENTS

| | | |
|---|---|---|
| 5,181,162 | 1/1993 | Smith et al. . |
| 5,265,221 | 11/1993 | Miller ...................................... 395/725 |
| 5,347,578 | 9/1994 | Duxbury ...................................... 380/4 |
| 5,581,691 | 12/1996 | Hsu et al. .......................... 395/182.13 |
| 5,634,127 | 5/1997 | Cloud et al. . |
| 5,911,143 | 6/1999 | Deinhart et al. ........................ 707/103 |

FOREIGN PATENT DOCUMENTS

| | | | |
|---|---|---|---|
| 0697662A1 | 2/1996 | European Pat. Off. | ........ G06F 12/14 |

OTHER PUBLICATIONS

Ferraiolo and Kuhn, "Role–Based Access Controls" Proc. 15th NIST–NSA National Computer Security Conference (1992).

Primary Examiner—Allen R. MacDonald
Assistant Examiner—Susanna Meinecke-Díaz
Attorney, Agent, or Firm—Michael De Angeli

[57] ABSTRACT

A workflow sequence specified by a process definition is managed by a workflow management system which enacts each segment in the order specified by that process definition. Role-based access control (RBAC) is used to define membership of individuals in groups, i.e., to assign individuals to roles, and to then activate the roles with respect to the process at appropriate points in the sequence. Any individual belonging to the active role can perform the next step in the business process. Changes in the duties and responsibilities of individuals as they change job assignments are greatly simplified, as their role memberships are simply reassigned; the workflow process is unaffected.

4 Claims, 1 Drawing Sheet

WORKFLOW MANAGEMENT EMPLOYING ROLE-BASED ACCESS CONTROL

CROSS-REFERENCE TO RELATED APPLICATION

This application claims priority from Provisional Patent Application Ser. No. 60/032,531, filed Dec. 6, 1996.

FIELD OF THE INVENTION

This invention relates to improvements in workflow management, that is, to improved automation of business processes carried out substantially or entirely on computer systems, by incorporation of role-based access control techniques.

BACKGROUND OF THE INVENTION

1. Workflow Technology

Many business and governmental organizations are increasingly employing "workflow technology", that is, means for automation of "business processes", to improve the efficiency of their operations. A "business process" involves the transfer of one or more documents, information, or tasks between participants according to a set of procedural rules in order to achieve business goals. In general, "workflow technology" relates to the computerization of business processes previously carried out on paper, typically involving the physical handing-off of paper files from one individual or workgroup to another as the steps in the business process are sequentially completed. More specifically, workflow technology consists of a set of tools to define and manage business processes; its goal is the complete or partial automation of a business process, without loss of controls required throughout the process. This requires, for example, that various individuals be provided access to a particular computer file at corresponding times, and not at others.

For example, suppose that according to preexisting practices within a business, an equipment purchase requires that a purchase requisition is to be originated by an engineering group, approved by an engineering manager, approved by an accounting group, and approved by a particular vice-president, before being forwarded to the purchasing department for ordering. Further, suppose the practice allows the approvals by the engineering manager and accounting group to be obtained in either order, as long as both are obtained before the proposal goes to the vice president. It will be apparent that a considerable amount of time and resources must be devoted to getting the correct signatures on the proper paper forms in the proper order, particularly if the various individuals involved are at different locations, or there is particular urgency.

Such a well-defined business process is a good candidate for automation according to present-day workflow technology. Essentially the process is originated by the original requisitioner creating a computer file, and passing it to a workflow software program. The program "knows" the proper sequence of approvals and other steps involved, and can prompt the various individuals and departments when it is their turn to handle the request. However, in order to ensure the integrity of the process, it is important that the software ensure that access to the appropriate computer file is passed in sequence from the engineering group simultaneously to the engineering manager and accounting group, and thence to the vice president, followed by the purchasing department, and that, after each has completed their task, their access is terminated. Further, the software must provide for the possibility that during each of these steps one or more persons may have access; for example, perhaps only one vice president can approve the request, but anyone above a certain level in the purchasing department can give the final approval. Workflow technology available as commercial software provides ready automation of processes of this kind.

More rigorously stated, "workflows" consist of a set of "activities" carried out in a predefined order. As such, access control becomes an integral part in the enactment of a workflow. Each activity requires privileged "operations", the access to which is restricted to authorized user(s) who participate in that activity. Moreover, the privileged operations permitted to a user may change as a workflow is processed. For example, an activity involving the purchase of an article of equipment is only permitted to a user until the purchase has been completed, whereupon the permission for that user to purchase the equipment is removed.

In presently available workflow processing software, and in proposals for further enhancements, access control has been provided to individuals by listing the individuals permitted to perform each of the operations defined for a particular workflow. These "connections" between the individuals and the permissions to perform the activities require careful and time-consuming maintenance. Particularly where the entire set of activities may be performed over a long period of time, such that individuals are likely to change their job responsibilities during the completion of the process, this practice can be troublesome. Extensive system overhead, in the form of time and trouble to system administrators and persons of similar responsibility, is required to ensure that the connections between the individuals and the activities they are permitted are constantly updated.

U.S. Pat. No. 5,634,127 to Cloud et al discusses use of workflow management as a means of conveniently interfacing two otherwise incompatible systems, as occurs, for example, when two banks having differing computer systems for accomplishing essentially similar tasks merge. By mapping the various system functions from the two systems to identical workflow entities, the task of marrying the two systems is greatly simplified. Hsu et al U.S. Pat. No. 5,581,691 relates to a generic workflow management system. Smith et al U.S. Pat. No. 5,181,162 refers to a document management and production system, e.g., for assembling the pages and sections of newspapers and the like. Workflow processing is referred to at column 5 as a means whereby the access of various workgroups to the document can be appropriately controlled.

2. Role-Based Access Control

Role-based access control ("RBAC") is a methodology for controlling access to computer systems. The use of RBAC is increasing in organizations, primarily because RBAC reduces administrative cost and complexity as compared to other access control mechanisms. With RBAC, access is based on a user's role within an organization. Consequently, access control administration is at a level of abstraction that is natural to the way that organizations typically conduct business.

Briefly stated, in RBAC systems, access to an object within a computer system is provided to "subjects" that are the members of groups termed "roles"; all subjects belonging to a given role have the same privileges to access various objects within the system. Individual "users" are then granted access to objects by being assigned membership in appropriate roles.

RBAC is considered useful in many commercial environments because it allows access to the computer system to be conveniently organized along lines corresponding to the actual duties and responsibilities of individuals within organizations. For example, RBAC allows the access provided by roles to conform to a preexisting hierarchy; in a hospital environment, members of the "doctor" role will have broader access to protected objects than would members of "nurse", who will in turn be given broader access than "health-care provider". Various types of privilege can be conveniently organized as a function of role assignments. For example, "doctor" membership may allow the user the privilege to read from or write to a pharmacy record, while "pharmacist" may only allow reading therefrom. Cardinality may be enforced; that is, only one general manager may exist at a given time. Roles may be exclusive; that is, an individual who is a member of "trader" in a commercial bank could not also be a member of "auditor" at the same time.

A particular advantage of RBAC is that it allows the access privileges provided to individuals to be very conveniently reconfigured as the individuals change job requirements, simply by deleting one's original assignment to a first role and adding one to the new role.

RBAC is described in "Role-Based Access Controls", Ferraiolo et al, *Proceedings of the 15th NIST-NSA National Computer Security Conference*, 1992, and operational RBAC software is available from several vendors. A rigorous mathematical basis for RBAC is provided by Ferraiolo et al, "Role based access control: Features and motivations", *Annual Computer Security Applications Conference*, IEEE Computer Society Press, 1995. This paper, which is not prior art to the present invention, is incorporated herein by reference. See also Sandhu et al, "Proceedings of the First ACM Workshop on Role Based Access Control", ACM, 1996, also not prior art to the present invention.

Insofar as known to the present inventor, the applicable prior art does not suggest that RBAC might be employed in connection with workflow technology.

OBJECTS OF THE INVENTION

It is therefore an object of the invention to provide more convenient, less costly use of workflow technology by employment of RBAC as the access control method thereof.

It is a further object of the invention to provide methods whereby RBAC may be employed to provide the access controls that are an important aspect of workflow technology.

It is a further object of the invention to provide improved security in implementation of workflow technology by reducing the occurrences of unauthorized access to information, by employment of RBAC as the means to access a workflow system. Summary of the Invention In a system that supports RBAC, the role is the means by which access to a resource is determined. In RBAC, access to a resource by a user is permitted only if:

(1) the permission required for access to the resource is assigned to a role; and
(2) that role is assigned to the user requesting access to the resource; and
(3) that role is activated in the user's session.

In addition to a role's use for access control, a role may be used to refer to the set of operations to which the permission(s) associated with that role grants access. Some implementations of RBAC make use of this concept by presenting the role as a menu choice to the user.

According to the present invention, roles are used in still another way. Because a role is the means by which access to a resource can be enforced, assignment of a permission to perform an operation and the removal of such an assignment can be used as a means to sequence a set of operations. The sequencing of operations is the fundamental behavior required to support workflow. Thus, an RBAC mechanism can be used as a means of implementing workflow.

According to the basic premise of workflow technology, a business process can be partitioned into sequential routing segments and parallel routing segments. A sequential routing segment has one or more activities which must proceed in a strictly sequential manner. A parallel routing segment has two or more activities which can proceed in parallel. The workflow specified by a process definition is managed by a workflow management system which enacts each segment in the order specified by that process definition. According to the invention, RBAC is used to define membership of individuals in groups, i.e., to assign individuals to roles, to assign permissions to roles, and to then activate the roles with respect to the process at appropriate points in the sequence. An RBAC system thus forms the basis for the enactment of workflow, i.e., an RBAC system is used as the basis for a workflow management system. Any individual belonging to the active role can perform the next step in the business process. Changes in the duties and responsibilities of individuals as they change job assignments are greatly simplified, as their role memberships are simply reassigned; the workflow process is unaffected.

BRIEF DESCRIPTION OF THE DRAWINGS

The invention will be better understood if reference is made to the accompanying drawings, in which.

DESCRIPTION OF THE PREFERRED EMBODIMENTS

Figure 1:
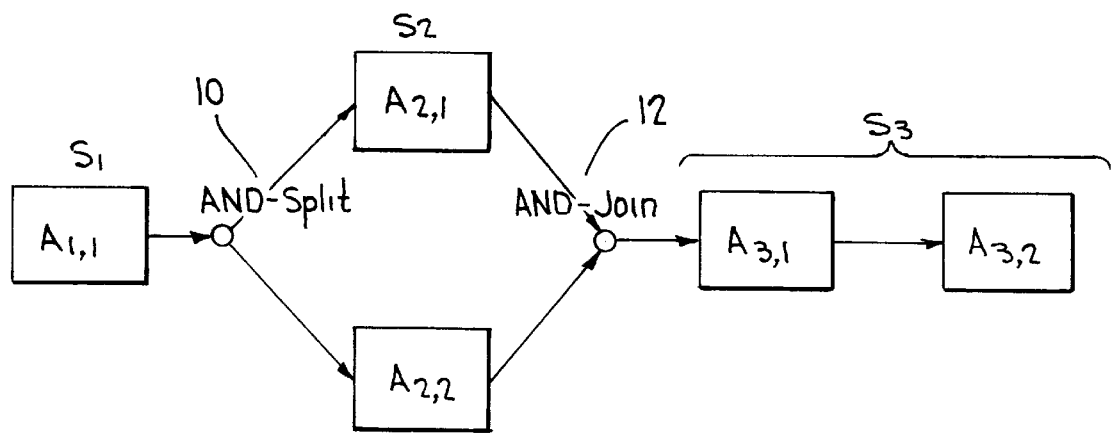
FIG. 1 illustrates an example of the partitioning of a business process into segments and activities, as required by the implementation of workflow technology.

The following definitions of terms used herein are provided for the convenience of the reader, and are not to be construed to limit the invention.

Access Control—The process of limiting access to the resources of a system only to authorized programs, processes, or other systems of a network.

Activity—A description of a piece of work that forms one logical step within a process. An activity is typically the smallest unit of work which is scheduled by a workflow engine during process enactment (e.g. using transition and pre/post-conditions), although one activity may result in several work items being assigned (to a workflow participant).

AND-Split—A point within the workflow where a single thread of control splits into two or more parallel activities.

AND-Join—A point in the workflow where two or more parallel executing activities converge into a single common thread of control.

Business Process—A set of one or more linked procedures or activities which collectively realize a business objective or policy goal, normally within the context of an organizational structure defining functional roles and relationships.

Invoked Application—A workflow application invoked by the workflow management system to automate an activity, fully or in part, or to support a workflow participant in processing a work item.

Object—A passive entity that contains or receives information.

Parallel Routing—A segment of a process instance under enactment by a workflow management system, where two or more activity instances are executing in parallel within the workflow, giving rise to multiple threads of control.

Permissions—A description of the type of authorized interactions a subject can have with an object.

Process Definition—The representation of a business process in a form which supports automated manipulation, such as modeling, or enactment by a workflow management system. The process definition consists of a network of activities and their relationships, criteria to indicate the start and termination of the process, and information about the individual activities, such as participants, associated information technology applications and data, etc.

Resource—Anything used or consumed while performing a function. The categories of resources are time, information, objects, or processors.

Role—A job function within an organization that describes the authority and responsibili conferred on a user assigned to the role, or (as will be clear from the context) an abstraction created to identify the function of an activity within a business process.

Stated differently, the role is the means by which access to a resource is determined; a role may also be used to refer to the set of operations to which the permission(s) associated with that role grants access.

Sequential Routing—A segment of a process instance under enactment by a workflow management system, in which several activities are executed in sequence under a single thread of execution. (No -split or -join conditions occur during sequential routing.)

Session—A mapping between a user and an activated subset of the set of roles to which the user is assigned.

Subject—An active entity, generally in the form of a person, process, or device, that causes information to flow among objects or changes the system state.

User—Any person who interacts directly with a computer system, or a computer process which may or may not represent a person.

Workflow—The automation of a business process, in whole or part, during which documents, information or tasks are passed from one participant to another for action, according to a set of procedural rules.

Workflow Management System—A system that defines, creates and manages the execution of workflows through the use of software, running on one or more workflow engines, which is able to interpret the process definition, interact with workflow participants and, where required, invoke the use of information technology tools and applications.

As set forth above, according to the basic premise of workflow technology, a business process to be automated is partitioned into a sequence of sequential routing segments and parallel routing segments. A sequential routing segment has one or more activities which must proceed in a strictly sequential manner. A parallel routing segment has two or more activities which can proceed in parallel. The workflow specified by a process definition is managed by a workflow management system which enacts each segment in the order specified by that process definition. According to the invention, RBAC is used to define membership of individuals in groups, i.e., to assign individuals to roles, assign permissions to roles, and then activate the roles with respect to the process at appropriate points in the sequence. An RBAC system thus forms the basis for the enactment of workflow, i.e., an RBAC system is used as the basis for a workflow management system.

The first step in the process for using RBAC to enact workflow according to the invention is again to partition a workflow representing a business process into a sequence of sequential and parallel routing segments, such that a conventional workflow management system can ensure that the segments are processed in the order specified in the process definition for the workflow. For example, see FIG. 1. The overall business process is partitioned into segments $S_1$, $S_2$, $S_3$, wherein $S_1$ consists of a single activity $A_{1,1}$. After $S_1$ is completed, the process is passed to an AND-Split processing junction 10, as the following segment $S_2$ includes parallel activities $A_{2,1}$ and $A_{2,2}$, which may be processed in either order, or simultaneously. When both activities $A_{2,1}$ and $A_{2,2}$, and thus $S_2$, have been completed, process control passes to an AND-Join junction 12, whereupon control passes to a third segment $S_3$, comprising sequential activities $A_{3,1}$, and $A_{3,2}$, performed in that order. The process is then complete.

Figure 2:
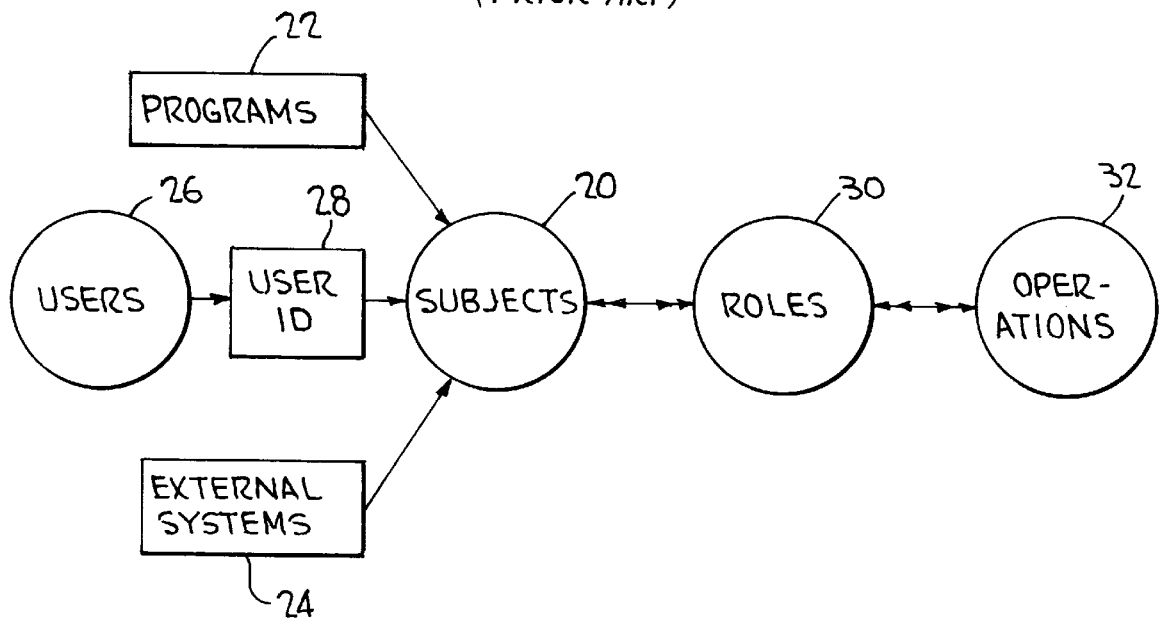
FIG. 2 illustrates the relation between users, subjects, roles, and operations in an RBAC system.

In an RBAC system, access to objects is managed at a level corresponding closely to the organization's structure. Each user is assigned one or more "roles", and each "role" is assigned one or more "permissions" that are authorized for users in that role. According to the present invention, permissions consist principally of the opportunity to perform operations within an activity of the workflow. FIG. 2 shows schematically the conventional RBAC organization. Subjects 20, which can represent external programs 22, external systems 24, or individual users 26, who will normally be identified to the system through a conventional identification process 28, are assigned to roles 30. The subjects 20 can then perform operations 32 as assigned to the roles 30. In this connection, "operations" includes "permissions" required to access objects within the protected system, such as stored documents, or to perform certain activities defined as part of the workflow. The operations provided for each role correspond to the duties and responsibilities of the persons having that role in the organization.

Therefore, according to the invention, having separated a workflow into sequential and parallel routing segments, given an activity in a sequential routing segment, an RBAC role unique to that activity is created; permissions to perform that activity are assigned to the role; and the role is assigned to the user responsible for performing that activity. The activation of that role grants the user the permissions necessary to perform that activity. Once an activity has been performed by the user, the permissions are withdrawn from the role, the user assignment for that role is withdrawn, and the role is removed from the RBAC system. Where more than one activity appears within a single sequential segment, as in segment $S_3$ of FIG. 1, the permissions corresponding to the activities are granted and withdrawn, by means of role assignment, in sequence as the activities are completed; in effect, the role unique to the segment is passed between the activities as a token, ensuring that the activities are processed sequentially, in the order specified by the process definition. When all activities in the sequential routing segment have been completed in the order specified, the next segment in the workflow is processed.

Given a parallel routing segment, such as segment $S_2$ of FIG. 1, a role unique to each activity in the segment is created for all activities in that segment. Permission to perform each activity is assigned to the unique role for that activity and the role unique to that activity is assigned to the user who performs the activity; that is, any individual belonging to the active role can perform the next step in the business process. Once these assignments have been made to all activities in the parallel routing segment, all of these activities are enabled for activation, such that they may all be executed in parallel. All activities are activated in a manner such that each activity's unique role is activated for a session of the user responsible for that activity. When all activities in the parallel segment have been completed, the next segment in the workflow is processed.

FIG. 1, discussed briefly above, gives an example of a workflow for automating a simple business process. As used for the generation and approval of a purchase request, the steps are as follows:

Sequential Routing Segment $S_1$:

Activity $A_{1,1}$: A member of a project team, the requisitioner, initiates a purchase request (PR) by creating an electronic PR form and digitally signing the form. According to the business process, the form must now go to the other two members of the project team for their digital signatures indicating their approval.

Parallel Routing Segment $S_2$:

Activity $A_{2,1}$—Second member of the project team digitally signs.

Activity $A_{2,2}$—Third member of the project team digitally signs.

Sequential Routing Segment $S_3$:

Activity $A_{3,1}$—The project manager digitally signs indicating approval.

Activity $A_{3,2}$—The division manager digitally signs indicating approval.

Once all of the signatures have been obtained, the PR form goes to the purchasing department.

This workflow example has a parallel routing segment and involves human interaction. Consequently, there can be more than one possible sequence of events that takes place as this workflow is processed. In particular, various individuals may have corporate authority to provide the various approvals needed at each segment. It is complex to provide sufficient "connections" between all authorized individuals and the segments of the workflow, particularly where many persons may have authority to perform certain activities. According to the invention, the right to perform the various activities are assigned to RBAC roles, and the individuals are assigned membership in the roles. The number of connections needed to be maintained between the user and roles and roles and activities in a system according to the invention is much less than the number of connections between users and activities in a non-RBAC workflow system; this disparity grows as the membership in the roles increases.

The following presents one possible sequence of events in performance of the process of enacting workflow using RBAC according to the invention. The example refers to a software program P4EW ("Process for Enacting Workflow") implementing the invention; in effect, P4EW provides an interface between conventional RBAC and workflow processing software.

1. First member of the project team selects a menu item to purchase a widget. This action initiates P4EW/R(WPR) to enact the workflow WPR for generation and approval of a purchase request for a widget. (In this description, the notation "WPR" identifies the workflow wf for this specific purchase request; "WPR" becomes the argument to P4EW/R(wf).)

Specifically, a subroutine of P4EW/R(WPR), $OP(A_{1,1})$, then creates role $ROLE(A_{1,1})$, and assigns permission to perform the corresponding activity $(A_{1,1})$ to $ROLE(A_{1,1})$, assigns $ROLE(A_{1,1})$ to one or more members of the project team, activates $ROLE(A_{1,1})$ in the first session, and sleeps.

2. By accessing $OP(A_{1,1})$, possibly in response to a prompt communicated automatically upon activation of $ROLE(A_{1,1})$, a member of the project team belonging to $ROLE(A_{1,1})$ electronically fills in the purchase request form and signs it under the direction of the invoked application $IA_{1,1}$ initiated by $OP(A_{1,1})$. The successful completion of $IA_{1,1}$ results in sending a successful completion message to P4EW/R(WPR).

3. P4EW/R(WPR) is then awakened. As a result of receiving the successful completion message from $OP(A_{1,1})$, P4EW/R(WPR) removes $ROLE(A_{1,1})$ and the associated assignments. It now creates role $ROLE(A_{2,1})$, makes the assignments to $ROLE(A_{2,1})$ necessary for the second member of the project team to perform $OP(A_{2,1})$, and activates ROLE $(A_{2,1})$. As segment $S_2$ includes parallel activities $A_{2,1}$ and $A_{2,2}$, P4EW/R(WPR) also creates $ROLE(A_{2,2})$, makes the assignments necessary for the project team to perform $OP(A_{2,2})$, and activates $ROLE(A_{2,2})$. P4EW/R(WPR) sleeps.

4. A member of $ROLE(A_{2,2})$ performs $OP(A_{2,2})$; in the example, reviews the purchase request for the widget, and signs. This action causes $OP(A_{2,2})$ to send a successful completion message to P4EW/R(WPR).

5. P4EW/R(WPR) is awakened by the receipt of the message indicating the successful completion of $OP(A_{2,2})$, removes $ROLE(A_{2,2})$ and its associated assignments from the RBAC system, and records the completion of $OP(A_{2,2})$. P4EW/R(WPR) sleeps.

6. A member of ROLE $(A_{2,1})$ performs $OP(A_{2,1})$; in the example, reviews the purchase request for the widget, and signs. This action causes $OP(A_{2,1})$ to send a successful completion message to P4EW/R(WPR).

7. P4EW/R(WPR) is awakened by the receipt of the message indicating the successful completion of $OP(A_{2,1})$, removes $ROLE(A_{2,1})$ and its associated assignments from the RBAC system, and records the completion of $OP(A_{2,1})$.

8. Since both activities of segment $S_2$ have now been successfully completed, P4EW/R(WPR) creates $ROLE(A_{3,1})$, assigns permission to perform $OP(A_{3,1})$ to $ROLE(A_{3,1})$, assigns $ROLE(A_{3,1})$, in the example, to the manager of the project team, activates $ROLE(A_{3,1})$ and sleeps.

9. The manager of the project team performs $OP(A_{3,1})$, that is, reviews the purchase request for the widget and signs. This action causes $OP(A_{3,1})$ to send a successful completion message to P4EW/R(WPR).

10. P4EW/R(WPR) is awakened by the receipt of the message indicating the successful completion of $OP(A_{3,1})$ and deactivates $ROLE(A_{3,1})$. P4EW/R(WPR) then assigns permission to perform $OP(A_{3,2})$ to $ROLE(A_{3,2})$, assigns $ROLE(A_{3,2})$, e.g., to the division manager, activates ROLE $(A_{3,2})$, and sleeps.

11. The division manager then performs $OP(A_{3,2})$ by reviewing and signing the purchase request for the widget. $OP(A_{3,2})$ then sends a successful completion message to P4EW/R(WPR).

12. P4EW/R(WPR) is awakened. As a result of receiving the successful completion message from $OP(A_{3,2})$ it removes role $ROLE(A_{3,2})$ and its associated assignments from the RBAC system.

The successful completion of workflow WPR causes P4EW/R(WPR) to terminate and be removed.

The method for employment of RBAC for controlling the permission of individuals to carry out operations with a workflow process according to the invention thus requires (1) that the workflow be decomposed into sequential and parallel segments; (2) that roles be created corresponding to each activity within each segment; (3) that, for each activity within each segment, permission to perform the operations thereof be assigned to the corresponding roles; (4) that individuals be assigned to each role; (5) that the roles be activated; (6) that each permission be withdrawn as the operations are completed; and (7) that the roles be deactivated as the segments are completed. If the segment under consideration is parallel, step (7) is simply delayed until all of the activities of all parallel processing paths are completed.

It will be apparent to those of skill in the art that in this way the advantages inherent in the RBAC system, in particular, the simplification of assignment of individuals to privileges by simply mirroring the organizational structure, and RBAC's ease of making changes in personnel privileges, can be used to simplify the administration of a workflow system. That is, by assigning the privilege to perform activities in the workflow system to roles rather than individuals, any individual assigned to an active role can perform the activity. Changes in the duties and responsibilities of individuals simply require their reassignment to new roles; the workflow process is not affected.

The following provides a detailed statement of the steps in setting up workflow processing of a sequential routing segment $S_j$ using RBAC to control access to the activities, according to the invention.

Create ROLES, in the RBAC System
For each activity $A_{j,k}$, k=1, . . . , $N_{S_j}$ in $S_j$:
    Assign permission to perform operation $OP_{A_{j,k}}(wf)$ to $ROLE_{S_j}$
    Assign $ROLES_{S_j}$ to $USER_{A_{j,k}}$
    Enable the capability for $OP_{A_{j,k}}(wf)$ to be activated
    Sleep, resuming at next line when completion message received from $OP_{A_{j,k}}(wf)$
    Remove assignment of $ROLE_{S_j}$ from $USER_{A_{j,k}}$
    Remove permission to perform operation $OP_{A_{j,k}}(wf)$ from $ROLE_{S_j}$
    Disable the capability for $OP_{A_{j,k}}(wf)$ to be activated
    If completion message indicated error:
        notify P4EW/R(wf) administrator or terminate
Remove $ROLE_{S_j}$ from the RBAC System The following provides a detailed statement of the steps in setting up workflow processing of a parallel routing segment $S_j$ using RBAC to control access to the activities, according to the invention.

For each activity $A_{j,k}$, k=1, . . . , $N_{S_j}$ in $S_j$:
    Create $ROLE_{A_{j,k}}$ in the RBAC System
    Assign permission to perform operation $OP_{A_{j,k}}(wf)$ to $ROLE_{A_{j,k}}$
    Assign $ROLE_{A_{j,k}}$ to $USER_{A_{j,k}}$
    Enable the capability for $OP_{A_{j,k}}(wf)$ to be activated
while not all $OP_{A_{j,k}}(wf)$ completed:
    Sleep, resuming at next line when completion message received from any $OP_{A_{j,k}}(wf)$
    Remove assignment of $ROLE_{A_{j,k}}$ from $USER_{A_{j,k}}$
    Remove permission to perform operation $OP_{A_{j,k}}(wf)$ from $ROLE_{A_{j,k}}$
    Remove $ROLE_{A_{j,k}}$ from the RBAC System
    Disable the capability for $OP_{A_{j,k}}(wf)$ to be activated
    If completion message indicated error:
        For all $OP_{A_{j,k}}(wf)$ still active:
            Terminate $OP_{A_{j,k}}(wf)$
            Remove assignment of $ROLE_{A_{j,k}}$ from $USER_{A_{j,k}}$
            Remove permission to perform operation $OP_{A_{j,k}}(wf)$ from $ROLE_{A_{j,k}}$
            Remove $ROLE_{A_{j,k}}$ from the RBAC System
            Disable the capability for $OP_{A_{j,k}}(wf)$ to be activated
        notify P4EW/R(wf) administrator or terminate
    Record the completion of $OP_{A_{j,k}}(wf)$ With this information, a person of ordinary skill in the art would have no difficulty in implementing the invention.

While a preferred embodiment of the invention has been described, it will be appreciated by those of skill in the art that further enhancements and modifications thereto are possible, specifically in connection with the details of assignments of roles to activities to segments within the workflow process. That is, in the above, roles are created, assigned, activated, and removed on an activity by activity basis thereby granting and removing permissions for a user to perform activities within a given segment in order to ensure that the activities are performed in the correct sequence and to ensure that unauthorized access does not result. Accordingly, these and other modifications to the preferred embodiment disclosed herein are intended to be within the scope of the following claims where not specifically excluded thereby.

What is claimed is:

1. A method for employment of role-based access control (RBAC) techniques for controlling the ability of individuals to carry out operations within a workflow process, comprising the steps of:

(1) decomposing the workflow process into sequential and parallel segments, each comprising one or more activities, wherein access to at least one specific instance of a resource is required for performance of each activity, said segments being ordered for performance in a defined sequence;

(2) creating roles corresponding to each segment in a role-based access control (RBAC) system, wherein a role is the means by which access to a specific instance of a resource is determined, whereby each of the activities comprised by each of the segments is assigned to one or more of the roles corresponding to each segment;

(3) assigning one or more individuals to each role;

(4) activating each role when all activities of all preceding segments have been successfully performed, by granting individual(s) assigned to an activated role permission to perform each activity within the corresponding successive segment;

(5) withdrawing each permission as the corresponding activity is completed; and (6) deactivating each role as the corresponding segment is completed.

2. The method of claim 1, wherein if the segment under consideration is parallel, step (6) is performed only after all of the activities thereof are completed.

3. The method of claim 1, wherein each role is activated only as the preceding activity is completed.

4. The method of claim 1, wherein each permission is granted only as the preceding activity is completed.

* * * * *